US008313270B2

(12) United States Patent
Hecht

(10) Patent No.: US 8,313,270 B2
(45) Date of Patent: Nov. 20, 2012

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 648 days.

(21) Appl. No.: 12/616,629

(22) Filed: Nov. 11, 2009

(65) Prior Publication Data

US 2010/0150670 A1    Jun. 17, 2010

(30) Foreign Application Priority Data

Dec. 16, 2008   (IL) .......................................... 195984

(51) Int. Cl.
*B23B 27/16* (2006.01)
*B23C 5/22* (2006.01)
(52) U.S. Cl. ............................. 407/113; 407/66; 407/96
(58) Field of Classification Search .................... 407/66, 407/67, 113, 114, 115, 116, 103, 96
See application file for complete search history.

(56) References Cited

U.S. PATENT DOCUMENTS

| 6,146,061 | A  | 11/2000 | Larsson |
| 6,203,251 | B1 | 3/2001  | Oppelt |
| 6,921,234 | B2 * | 7/2005 | Arvidsson et al. ............ 407/103 |
| 7,387,474 | B2 * | 6/2008 | Edler et al. ..................... 407/113 |
| 7,510,354 | B2 * | 3/2009 | Andersson et al. ............ 407/113 |
| 7,578,641 | B2 * | 8/2009 | Andersson et al. ............ 407/113 |
| 2007/0248425 | A1 | 10/2007 | Andersson |

FOREIGN PATENT DOCUMENTS

| WO | 2008 073037 | 6/2008 |
| WO | 2008 073038 | 6/2008 |

OTHER PUBLICATIONS

International Search Report dated Mar. 10, 2010 issued in corresponding International Application No. PCT/IL2009/001109.

* cited by examiner

*Primary Examiner* — Will Fridie, Jr.
(74) *Attorney, Agent, or Firm* — Womble Carlyle

(57) ABSTRACT

A cutting tool includes one or more cutting portions, each including an insert pocket having a cutting insert releasably retained therein. The cutting insert has a bottom surface, including a plurality of surfaces, engaging a plurality of walls of the insert pocket in a plurality of sloping and non-sloping engagement regions. These engagement means provide secure and stable clamping of the cutting insert, and prevent displacement of the cutting insert during intensive cutting operations, such as high speed milling, e.g., by significantly decreasing the force exerted on the screw that fastens the cutting insert in the insert pocket.

22 Claims, 6 Drawing Sheets

CUTTING TOOL AND CUTTING INSERT THEREFOR

FIELD OF THE INVENTION

The present invention relates to an arrangement for securing a cutting insert to an insert pocket of a cutting tool.

BACKGROUND OF THE INVENTION

There are known many different ways for securing a cutting insert to an insert pocket of a cutting tool. For example, there are many known clamping mechanisms for clamping the cutting insert in the insert pocket that include a clamping screw. The clamping screw is inserted through a through-bore formed in the cutting insert, and screwably received in a threaded bore formed in the insert pocket, to clamp the cutting insert therein. In some cutting tools the clamping arrangement is 'radial', i.e., the rotation axis of the clamping screw is generally perpendicular to a radial plane—which is parallel to, and which extends through—the axis of rotation of the cutting tool.

In many metal cutting operations and specifically, in metal cutting operations involving high speed milling or in other intensive cutting operations, the clamping screw may be exposed to large forces. These forces may include, for example, centrifugal forces caused by the rotation of the cutting tool, forcing the cutting insert away from the insert pocket in a radially outward direction. Other large forces may include forces that arise from the interaction of the cutting insert with the work-piece, which might displace the cutting insert from its secured position in the insert pocket.

These large forces, especially if exerted for extended periods of time, risk deforming and eventually breaking the clamping screw, e.g., by tearing the screw-head away from the clamping screw body, or by breaking the clamping screw body in two—and thereby separating the cutting insert from the insert pocket. In attempt to prevent this, for example, some rotary cutting tools are deliberately limited to a relatively low rotation rate, which may lead to a limited performance of the cutting tools.

An additional disadvantage arises in some clamping mechanisms, in which the threaded bore and through-bore are manufactured to be eccentric to one another in order to force the cutting insert against supporting surfaces of the insert pocket upon fastening of the clamping screw. In some cutting tools using these clamping mechanisms, the eccentricity of the through-bore and threaded bore leads to unnecessary exertion of pressure on various parts of the clamping screw, thus weakening the clamping screw and decreasing the amount of externally exerted force that the clamping screw can withstand.

Attempts have been made to solve some of the above disadvantages. For example, some cutting tools are manufactured in which engagement of the bottom surface of the cutting insert with the corresponding attachment surface of the insert pocket is obtained by means of complementary elements formed in the two surfaces. Examples of such complementary elements are rib-groove elements, male like-female like elements, serrated elements, etc. The engagement obtained this way may relatively efficiently prevent undesired displacement of the cutting insert relative to the insert pocket during the cutting operation.

However, in cutting tools using the above-mentioned solution the engagement obtained between the surfaces extends over a plurality of large engagement areas. This may require extensive grinding and finishing of both the bottom and attachment surfaces, in order to obtain good engagement therebetween, and in addition to obtain an accurate placement of the cutting insert in the insert pocket. Therefore, some cutting tools that include these engagement means are expensive to manufacture, while in some others the cutting inserts are poorly positioned in their respective insert pockets.

SUMMARY OF THE INVENTION

According to some embodiments of the present invention, a cutting tool is disclosed, having at least one cutting portion that includes an insert pocket, the insert pocket having a cutting insert releasably retained therein. A bottom surface of the cutting insert and a corresponding attachment surface of the insert pocket are generally complimentarily shaped, to achieve a force-withstanding, secure engagement between the surfaces, and thus provide the cutting insert with high resistance to exertion of external forces such as centrifugal or other forces exerted thereon, e.g., during operation of the cutting tool.

The disclosed means of engagement between the bottom and attachment surfaces do not over-constrain the placement of the cutting insert in the insert pocket, and therefore additionally provide accurate and convenient securing of the cutting insert in the insert pocket. For example, ordinary imperfections in the manufacturing of the bottom and attachment surfaces do not affect the accuracy or the strength of the engagement between the two surfaces, and therefore the cutting insert and tool therefor are relatively inexpensive to manufacture, e.g., by virtue of omitting the requirement to extensively grind and finish the two engaging surfaces.

In some embodiments, due to the provided engagement of the bottom and attachment surfaces, the cutting insert is not required to engage a major wall of the insert pocket, i.e., since the engagement means provide the cutting insert with satisfactory engagement, e.g., in the radial direction. The obtained engagement between the bottom and attachment surfaces may additionally allow a through-bore, formed in the cutting insert, and a threaded bore, formed in the insert pocket, both receiving a clamping screw therein to be substantially concentric, or almost concentric, therewith. This may allow the clamping screw to be exposed to a relatively small clamping pressure when received in the threaded bore, and thus withstand relatively large external forces exerted thereon.

According to some embodiments, for example, the bottom surface includes a plurality of engagement surfaces, of which a plurality of operative engagement surfaces engage the attachment surface at respective sloping and non-sloping engagement regions. The operative engagement surfaces may include operative, spaced apart first and second sloping surfaces, whose respective sloping engagement regions co-lie in a first plane, which in turn forms an acute angle with a first median plane of the cutting insert. The operative engagement surfaces may additionally include an operative inner sloping surface whose inner sloping engagement region lies in a second plane, which forms an obtuse angle with the first median plane, wherein the acute and obtuse angles are measured in the same direction from the first median plane.

The operative engagement surfaces may also include operative first and second corner surfaces whose respective non-sloping corner engagement regions co-lie in a third plane, which may be substantially perpendicular to the first median plane and to a second median plane of the cutting insert, the second median plane being perpendicular to the first median plane. In some embodiments the operative first and second sloping surfaces and the operative inner sloping surface are located on a first side of the first median plane, and the operative first and second corner surfaces are located on a second side of the first median plane.

In some embodiments, the cutting insert includes two major recessed surfaces positioned opposite one another relative to the second median plane. The cutting insert may additionally include two inoperative corner surfaces, wherein the corner surfaces are located at four respective corners of the bottom surface. The two operative sloping surfaces and two additional inoperative sloping surfaces slope downward and outward, from opposite sides of the two major recessed surfaces, respectively, toward respective corner surfaces. In some embodiments, the cutting insert includes a central surface positioned at a generally central area of the bottom surface.

The cutting insert may include an additional, inoperative inner sloping surface, wherein the inner sloping surfaces are located at opposite sides of the bottom surface on either side of the median plane. The inner sloping surfaces slope upward and outward from opposite sides of the cutting insert relative to the first median plane, and towards respective major sides.

In some embodiments, the cutting insert has a generally rectangular contour and two cutting corners, the cutting insert being 180 degrees indexable about a through-bore formed therein. In other embodiments, the cutting insert includes a generally square contour and four cutting corners, the cutting insert being 90 degrees indexable about a through-bore formed therein.

BRIEF DESCRIPTION OF THE DRAWINGS

For a better understanding of the present invention and to show how the same may be carried out in practice, reference will now be made to the accompanying drawings, in which.

Figure 1:
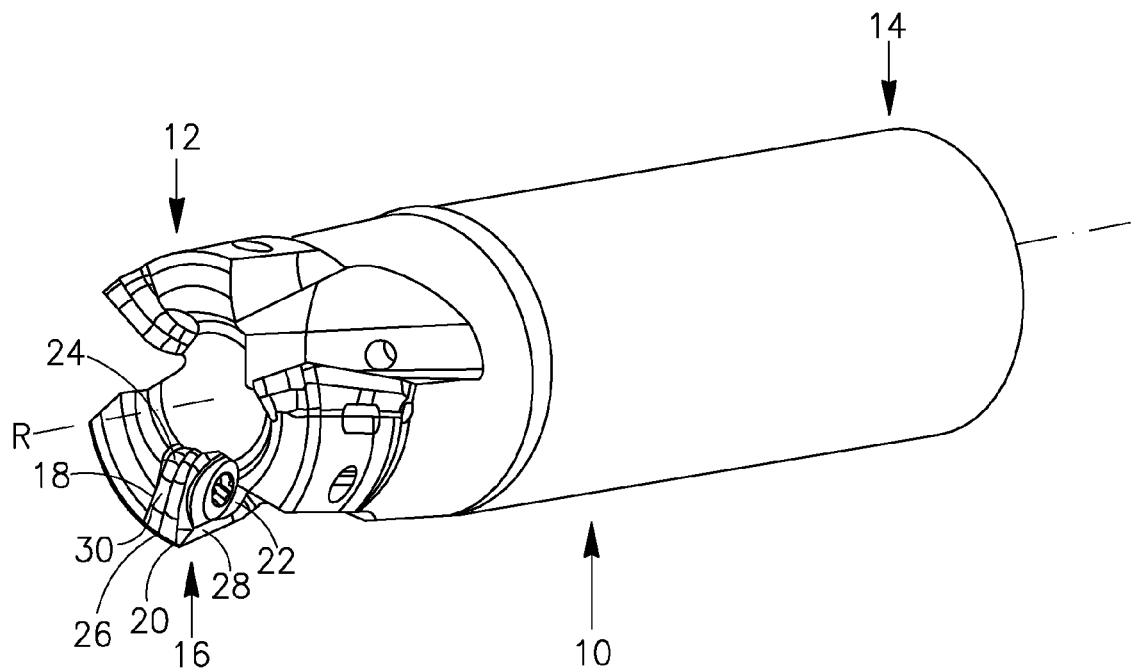
FIG. 1 is a perspective view of a cutting tool having one or more cutting portions, in accordance with some embodiments of the invention.
Figure 2:
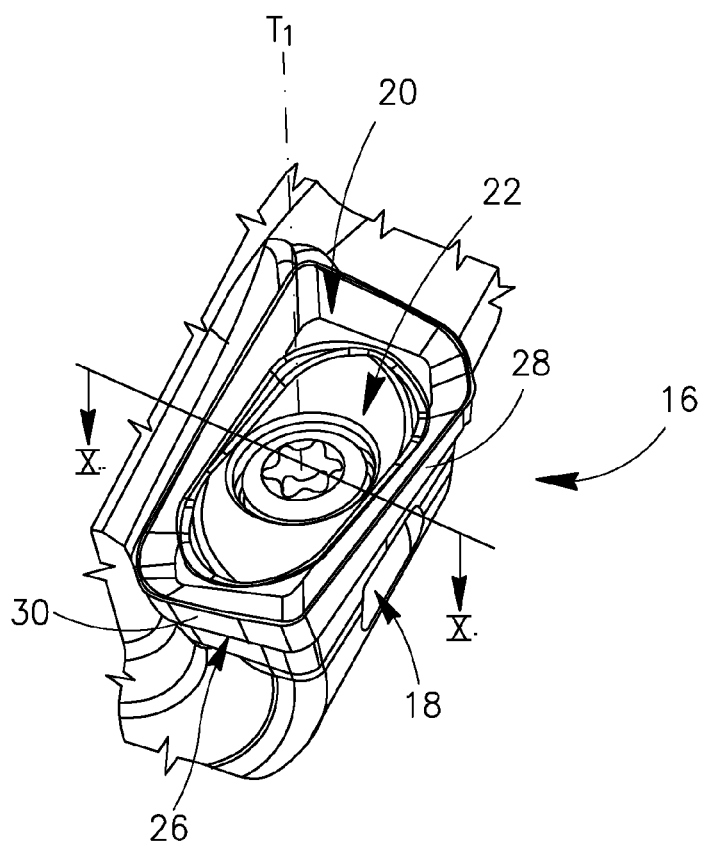
FIG. 2 is a perspective view of a cutting portion of the cutting tool shown in FIG. 1, including an insert pocket, a cutting insert and a clamping screw, in accordance with some embodiments of the invention.
Figure 4:
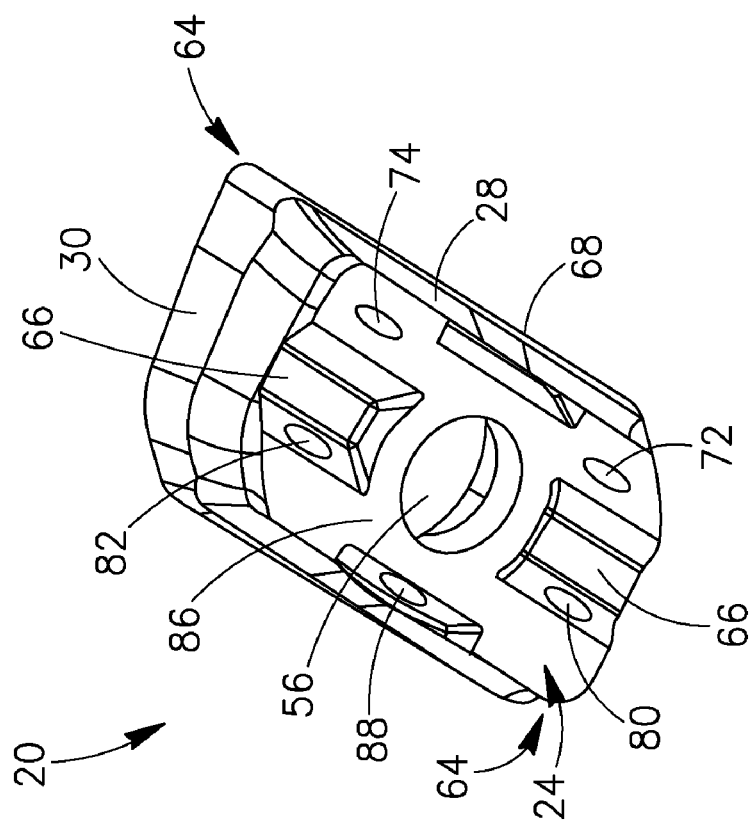
FIG. 4 is a perspective bottom view of the cutting insert shown in FIG. 3, in accordance with some embodiments of the invention.
Figure 3:
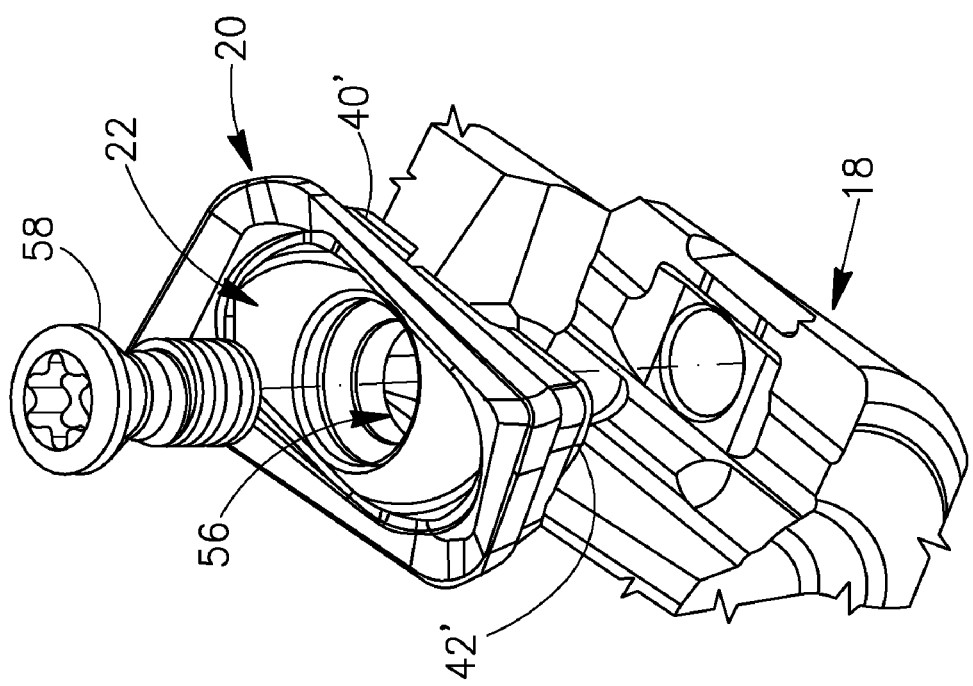
FIG. 3 is an exploded view of the cutting portion shown in FIG. 2, in accordance with some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some drawings herein show, and/or some descriptions herein refer to a rotating cutting tool such as a milling tool, the present invention is not limited in this respect. For example, some embodiments of the invention may refer to a plurality of other cutting tools e.g., to various other rotating tools such as drilling tools, reaming tools or the like, or to turning tools, or to any other metal cutting tool that include one or more releasably retained cutting inserts.

The term "placement" as used herein refers to the position and orientation of the cutting insert, e.g., relative to the retaining insert pocket. Thus, the term "secure placement" means, for example, that the cutting insert is generally resistant to displacement relative to the retaining insert pocket, e.g., under external forces exerted thereon, e.g., during operation of the cutting tool.

Reference is made to FIG. 1, showing a cutting tool 10 in accordance with some embodiments.

In some embodiments, the cutting tool has a front end 12, a rear end 14, and rotates about an axis of rotation R. The cutting tool includes one or more cutting portions 16, each cutting portion including an insert pocket 18, having a respective cutting insert 20 retained therein, e.g., an indexable cutting insert. Each cutting insert 20 includes a top surface 22, a bottom surface 24 and a peripheral surface 26 extending therebetween, the peripheral surface including two major sides 28 and two minor sides 30. The cutting insert 20 is typically made of extremely hard and wear-resistant material such as cemented carbide, either by form-pressing or by injection molding and sintering carbide powders in a binder. The cemented carbide may be, for example, tungsten carbide. The cutting insert 20 may be coated, partially coated or uncoated.

Reference is made to FIGS. 2-8, showing a plurality of views of the cutting portion 16 and various components thereof, according to some embodiments of the invention.

In some embodiments, the insert pocket includes an attachment surface 32 formed therein, to engage the bottom surface 24. The bottom surface 24 and attachment surface 32 are formed to be generally complementarily shaped. The bottom surface 24 includes, for example, a plurality of engagement surfaces formed therein, to achieve engagement with respective surfaces formed in the attachment surface 32, as described in greater detail below. For example, in some embodiments the engagement surfaces of the bottom surface 24 include two first sloping surfaces 34, two second sloping surfaces 36, two inner sloping surfaces 38, two first corner surfaces 40 and two second corner surfaces 42.

The engagement surfaces include a plurality of operative engagement surfaces, i.e., engagement surfaces operatively engaging the respective surfaces of the attachment surface 32, e.g., in a configuration shown in FIGS. 2-10. The operative engagement surfaces may include operative first and second sloping surfaces 34', 36', an operative inner sloping surface 38', and operative first and second corner surfaces 40', 42', which operatively engage first and second sloping walls 44, 46, an inner sloping wall 48, and first and second support surfaces 50, 52, formed in the attachment surface 32, respectively.

In some embodiments, the engagement surfaces additionally include a plurality of inoperative engagement surfaces. The inoperative engagement surfaces may include, for example, inoperative first and second sloping surfaces 34", 36", an inoperative inner sloping surface 38" and inoperative first and second corner surfaces 40", 42". One or more of the inoperative engagement surfaces may become operative, and vice versa, e.g., in other configurations, for example, upon indexing of the cutting insert 20.

In some embodiments, for example, the above-mentioned operative engagement surfaces, i.e., the first and second spaced apart operative sloping surfaces 34', 36', the operative inner sloping surface 38' and the operative first and second corner surfaces 40', 42', are the only surfaces that operatively engage the attachment surface 32. Additionally, in some embodiments, for example, the above-mentioned operative engagement surfaces, together with an additional engagement surface formed in one of the minor sides 30 engaging a minor wall 54 of the insert pocket, are the only surfaces of the cutting insert 20 operatively engaging the insert pocket 18.

Thus, the cutting insert's bottom surface 24 can be considered to comprise two sets of cooperating engagement surfaces, only one set of which can be operative at a given time. Engagement surfaces 34', 36', 38', 40' and 42' constitute a first set of cooperating engagement surfaces while engagement surfaces 34", 36", 38", 40" and 42" constitute a second set of cooperating engagement surfaces. Furthermore, in some embodiments, each set may be augmented by an additional engagement surface formed in an associated minor side 30.

In some embodiments, a central through-bore 56 is formed in the cutting insert 20 to receive a clamping screw 58 therein, which in turn secures the cutting insert 20 in the insert pocket 18. The through-bore 56 may be formed in the generally central portion of the cutting insert 20, and extend between the top and bottom surfaces 24, 32. The through-bore 56 has a through-bore axis $T_1$. A threaded bore 60 is formed in the attachment surface 32, to screwably receive the clamping screw 58 therein.

Figure 6:
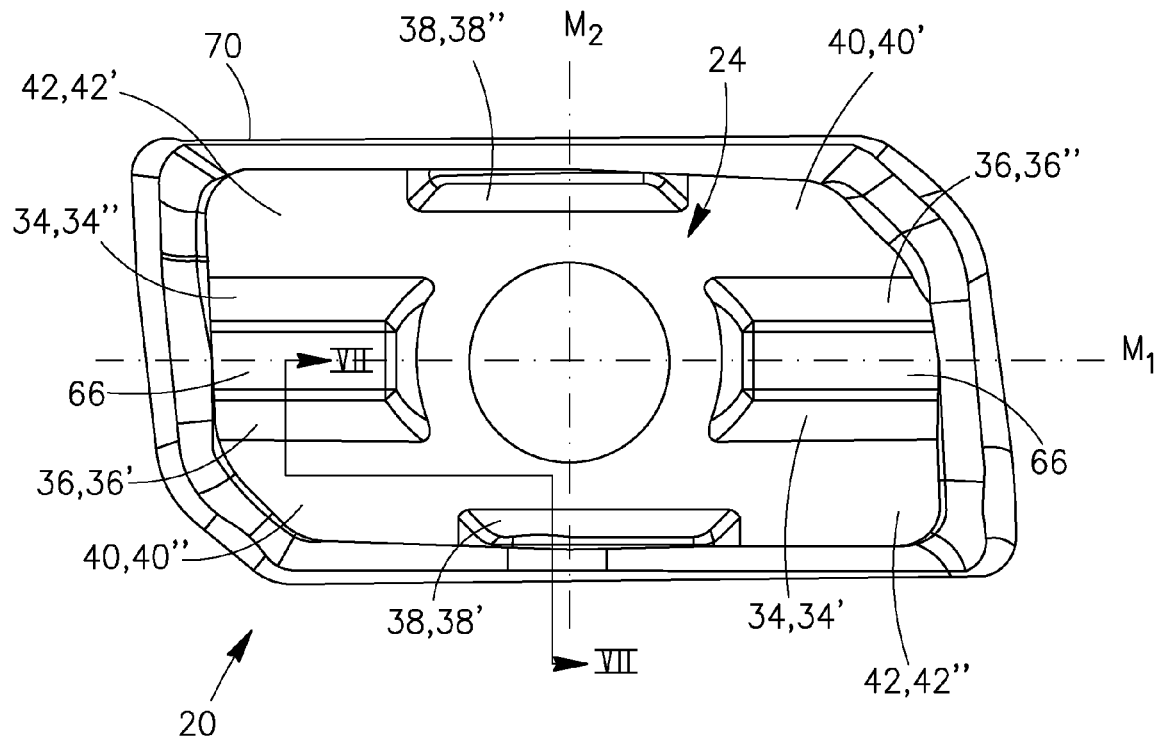
FIG. 6 is a bottom view of the cutting insert shown in FIG. 4, in accordance with some embodiments of the invention.

In some embodiments, for example, the cutting insert 20 has a generally rectangular contour, e.g., as seen from a bottom view thereof, e.g., as shown in FIG. 6. The cutting insert according to these embodiments is 180 degrees indexable about the through-bore axis $T_1$, and has two cutting corners 64.

Figure 5:
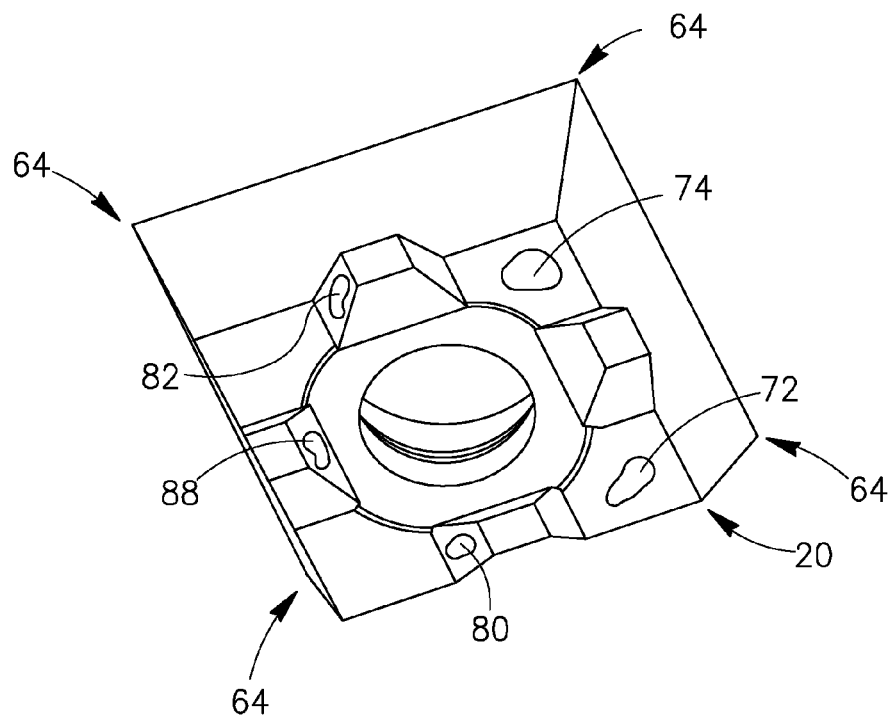
FIG. 5 is a perspective bottom view of a cutting insert in accordance with some other embodiments of the invention.

According to other embodiments of the invention, the cutting insert 20, e.g., as shown in FIG. 5, has a generally square contour, e.g., as would be seen from a bottom view thereof. The cutting insert 20, according these other embodiments, is 90 degrees indexable about the through-bore axis $T_1$, and has four cutting corners 64.

A first median plane $M_1$ of the cutting insert 20 generally extends through the through-bore axis $T_1$ and substantially halves each of major recessed surfaces 66 formed in the bottom surface 24, described below. A second median plane $M_2$ of the cutting insert 20 generally extends through the through-bore axis $T_1$ (intersecting the first median plane $M_1$ thereat), and is perpendicular to the first median plane $M_1$. The two major recessed surfaces 66 are located opposite one another, on opposite sides of the second median plane $M_2$, and are recessed, for example, relative to the corner surfaces 42.

In some embodiments, the first and second corner surfaces 40, 42 are alternately located at four corners of the bottom surface 24 The first and second corner surfaces 40, 42 may be planar or generally planar, and/or assume a generally rectangular shape, or other convenient shapes. In some embodiments, the corner surfaces are co-planar with the bottom surface 24 and a central surface 86 thereof. In other embodiments, the corner surfaces 40, 42 constitute the bottommost portions of the cutting insert 20, and protrude in a direction away from the top surface 22, relative to other surfaces formed on the bottom surface 24, including the central surface 86.

The operative first and second corner surfaces 40', 42' engage the first and second support surfaces 50, 52 at first and second non-sloping corner engagement regions 72, 74, respectively. Although the first and second non-sloping corner engagement regions 72, 74, and other engagement regions described below, i.e., two sloping engagement regions 80, 82 and an inner sloping region 88, are shown to have a generally elliptical shape, this shape has been chosen for illustrative purposes only. The engagement regions 72, 74, 80, 82, 88 are not limited in this respect, and may each assume any convenient shape, e.g., based on geometries of the respective operative engagement surfaces associated therewith. It can be seen, however, that each set of cooperating engagement surfaces (34', 36', 38', 40' and 42' or 34", 36", 38", 40" and 42") on the cutting insert's bottom surface 24 includes both sloping and non-sloping engagement regions.

In some embodiments, for example, the non-sloping corner engagement regions 72, 74 lie coplanar in a corner engagement plane, for example, which is generally perpendicular to the first and second median planes $M_1$ and $M_2$. Thus, the non-sloping corner engagement regions 72, 74 each lie on a plane, such as defined by a flat portion of the insert's bottom surface 24, that forms right angles with both the first and second median planes $M_1$ and $M_2$. The first and second support surfaces 50, 52 are positioned adjacent to an outer edge 76 connecting the attachment surface 32 to an outer surface 78 of the insert pocket 18. The first and second support surfaces 50, 52 may be planar, or generally planar, or assume other appropriate shapes, e.g., to achieve good engagement with the operative corner surfaces 40', 42', respectively.

The first sloping surfaces 34 slope downward and outward, from a first side of respective major recessed surfaces 66, toward respective second corner surfaces 42. Similarly, the second sloping surfaces 36 slope downward and outward, from a second side of respective major recessed surfaces 66, toward respective first corner surfaces 40. The first and second sloping surfaces may be coplanar and/or planar, or assume other convenient shapes.

The operative first and second sloping surfaces 34', 36' engage the first and second sloping walls 44, 46 in the first and second sloping engagement regions 80, 82, respectively. The first and second sloping walls 44, 46 may be planar, or assume other convenient shapes, e.g., to achieve good engagement with the respective operative first and second sloping surfaces 34', 36'.

Figure 7:
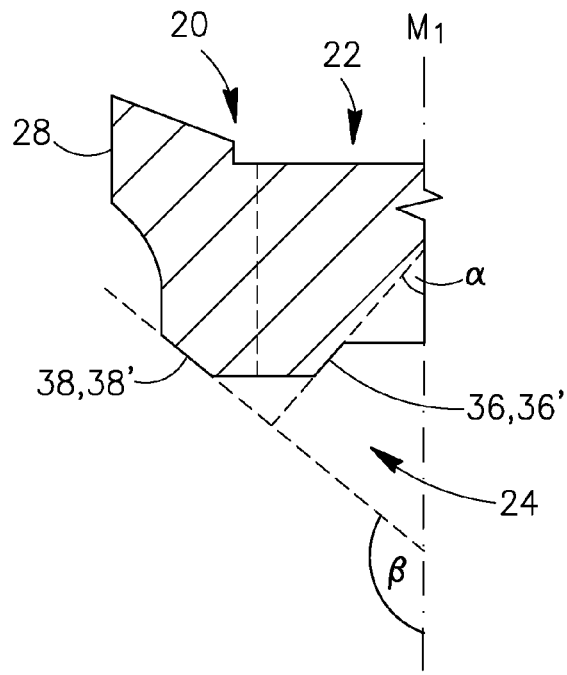
FIG. 7 is a cross section view of the cutting insert shown in FIG. 6, taken along the line VII-VII, in accordance with some embodiments of the invention.

In some embodiments, the sloping engagement regions 80, 82 lie coplanar in a sloping engagement plane, which forms an acute angle α with the first median plane $M_1$, e.g., as shown in FIG. 7. In some embodiments, for example, the acute angle α does not exceed 75 degrees, whereas in other embodiments the acute angle α takes on other appropriate values.

The bottom surface 24 may include a central surface 86 located at a generally central area of the bottom surface 24. The inner sloping surfaces 38 may slope upward and outward from opposite sides of the central surface 86 toward respective major sides 28. The inner sloping surfaces 38 may be planar, or assume other convenient shapes.

The operative inner sloping surface 38' engages the inner sloping wall 48 at the inner sloping engagement region 88. The actual size of the inner sloping surfaces 38 may be varied since it is only the inner sloping engagement region 88 that engages the inner sloping wall 48. Therefore, the inner sloping surfaces 38 may extend to any required extent. The inner sloping wall 48 slopes upward from a central region 90 of the attachment surface 32 toward the major wall 84. The inner sloping wall 48 may be planar, or assume other convenient shapes, e.g., to achieve good engagement with the operative inner sloping surface 38'.

In some embodiments, the inner sloping engagement region 88 lies in an inner sloping engagement plane, forming an obtuse angle β with the first median plane $M_1$, e.g., as shown in FIG. 7, whereas the acute angle α and obtuse angle β are measured in the same direction from the first median plane $M_1$. For example, both the acute angle α and the obtuse angle β are measured by starting in a bottom part of the first median plane $M_1$, and advancing in a clockwise direction. In some embodiments, for example, the obtuse angle β exceeds 105 degrees, whereas in other embodiments the obtuse angle β takes on other appropriate values. This may contribute, for example, to achieve a secure placement of the cutting insert 20 in the insert pocket 18.

Figure 8:
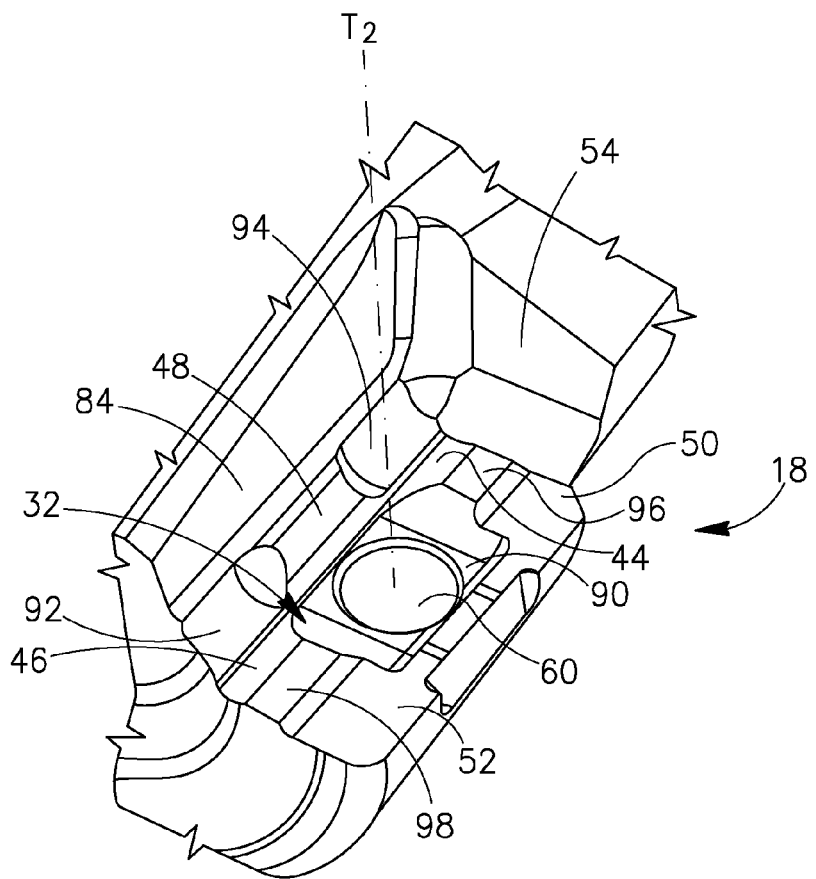
FIG. 8 is a perspective view of the insert pocket shown in FIG. 3, in accordance with some embodiments of the invention.

In some embodiments, the attachment surface 32 includes an outer groove 92 and an inner groove 94, to receive therein the inoperative first and second corner surfaces 40", 42", respectively. The inner groove 94 extends between the major wall 84 and an inner protruding surface 96 formed in the attachment surface 32. The outer groove 92 extends between the major wall 84 and an outer protruding surface 98 formed in the attachment surface 32, e.g., as shown in FIG. 8.

In some embodiments, the inoperative first corner surface 40" is received in, but does not make contact with, the outer groove 92. The inoperative second corner surface 42" is received in, but does not make contact with, the inner groove 94. Similarly, the inner and outer protruding surfaces 96, 98 may protrude relative to other surfaces of the attachment surface 32, but not make contact with the respective major recessed surfaces 66, e.g., as shown and described below with reference to FIG. 9.

In some embodiments, the non-sloping corner engagement regions 72, 74 are relatively spaced apart from the sloping engagement regions 80, 82, respectively. For example, the average distance between the first non-sloping corner engagement region 72 and the first sloping engagement region 80 may be at least 60 percent of the overall width of the cutting insert 20. The relatively large spacing between the various engagement regions may contribute, for example, to achieve the secure and stable placement of the cutting insert 20 in the insert pocket 18. In accordance with the present invention, the non-sloping corner engagement regions 72, 74 are located at one side of the first median plane $M_1$, and the sloping and inner sloping engagement regions 80, 82, 88 are located at the opposite side of the first median plane $M_1$.

The threaded bore 60 has a threaded bore axis $T_2$. In some embodiments the threaded bore 60 and bore-through 56 are substantially concentric, or almost concentric, i.e., the through-bore axis $T_1$ and the threaded bore axis $T_2$ may coincide, or almost coincide, or the like. For example, the through-bore axis $T_1$ and the threaded bore axis $T_2$ may both be contained in the first median plane $M_1$.

Figure 9:
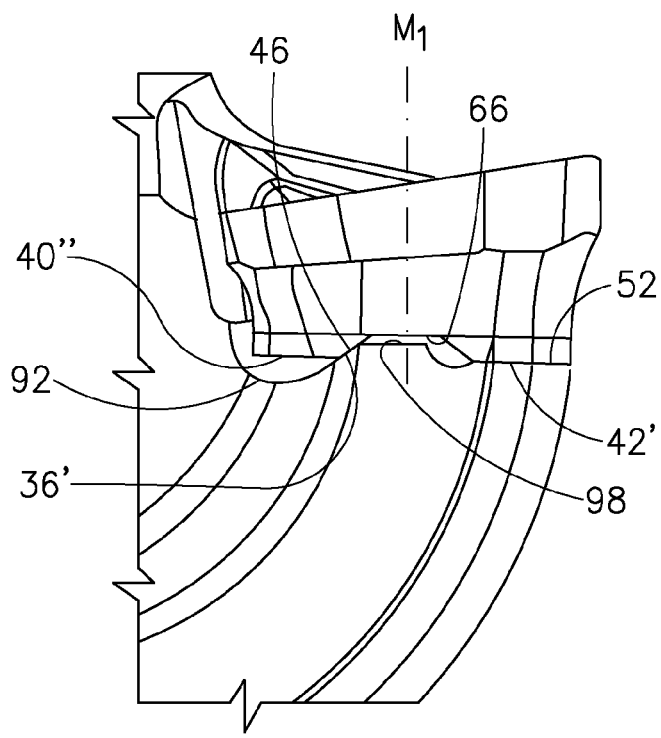
FIG. 9 is a front view of the cutting portion shown FIG. 2, in accordance with some embodiments of the invention.
Figure 10:
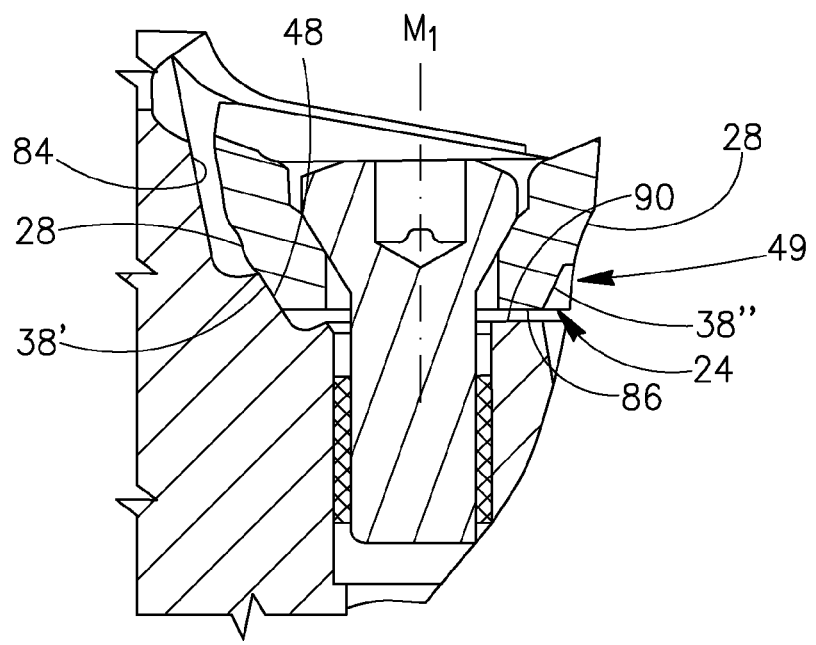
FIG. 10 is a cross section of the cutting portion shown in FIG. 2, taken in the plane X-X, in accordance with some embodiments of the invention.

Reference is made to FIGS. 9 and 10, showing views of the cutting portion 16.

As described above, the bottom surface 24 may engage the attachment surface 32, for example, only in the above-mentioned engagement regions 72, 74 80, 82, 88. For example, as shown in FIG. 9, the operative second sloping surface 36' engages the second sloping wall 46, and the operative second corner surface 42' engages the second support surface 52, whereas the major recessed surface 66 does not engage the outer protruding surface 98, and the inoperative first corner surface 40" does not engage the outer groove 92. As shown in FIG. 10, the operative inner sloping surface 38' engages the inner sloping wall 48, whereas the central surface 86 does not engage the central region 90. Furthermore, each inner sloping surface 38', 38" may be located in a side recess 49 formed in each major side 28, the side recess 49 communicating with the bottom surface 24 of the cutting insert. Additionally, e.g., as described above, the major side 28 does not engage the major wall 84.

Figure 11:
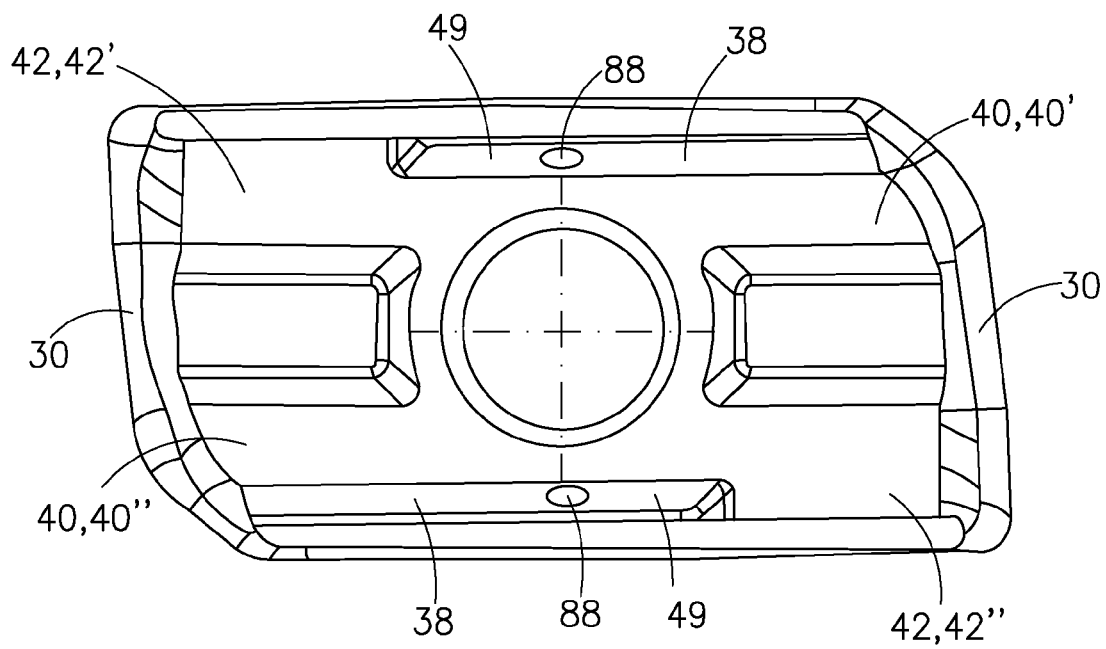
FIG. 11 is a bottom view of a cutting insert of the present invention in accordance with an alternative embodiment.

As already pointed out, the actual size of the inner sloping surfaces 38 may be varied since it is only the inner sloping engagement region 88 that engages the inner sloping wall 48. Therefore, the inner sloping surfaces 38 may extend to any required extent. In some embodiments, as shown in FIG. 11, the inner sloping surfaces 38 and their associated side recesses 49 may extend to an adjacent minor side 30 thereby reducing the size, for example, of the first corner surfaces 40. This somewhat reduces the area of contact of the operative first corner surface 40' with the first support surface 50, however, the area of contact of the operative second corner surface 42' with the second support surface 52 remains unchanged. In such embodiments the recess 49 are open ended at one end, opening out to respective minor side surfaces 30. Such embodiments are useful if it is required to grind the inner sloping surfaces 38 in order to increase the planarity of the inner sloping surfaces 38.

Figure 12:
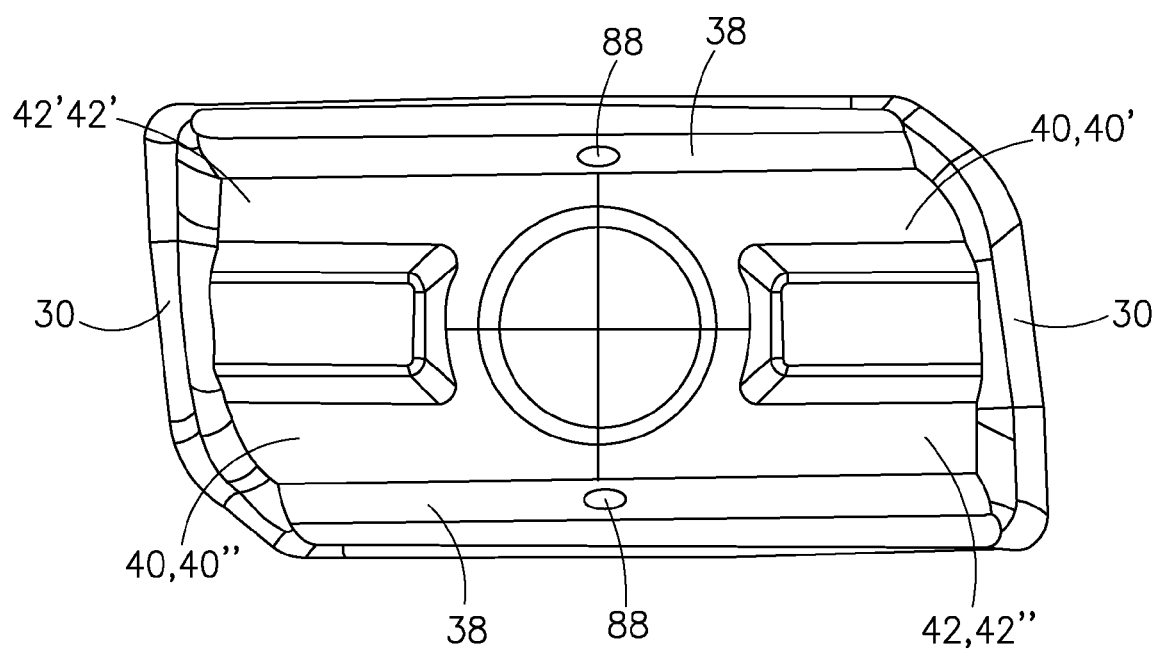
FIG. 12 is a bottom view of a cutting insert of the present invention in accordance with another alternative embodiment.

In other embodiments, as shown in FIG. 12, the inner sloping surfaces 38 may extend to both minor sides 30. Such embodiments make the grinding of the inner sloping surfaces 38 easier and efficient. However, the size of both the first and second corners 40, 42 is reduced in size.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

The invention claimed is:

1. A cutting tool, comprising at least one cutting portion, the at least one cutting portion (16) comprising:

an insert pocket (18) having a cutting insert (20) releasably retained therein, wherein the cutting insert (20) has a top surface (22), a bottom surface (24), and a peripheral surface (26) extending therebetween, the peripheral surface (26) comprising two opposing major sides (28) and two opposing minor sides (30); the bottom surface (24) comprises a plurality of engagement surfaces, of which a plurality of operative engagement surfaces engage an attachment surface (32) of the insert pocket (18) in a respective plurality of sloping and non-sloping engagement regions; the plurality of operative engagement surfaces comprising:

first and second spaced apart operative sloping surfaces (34', 36'), whose respective sloping engagement regions (80, 82) lie in a first plane forming an acute angle (α) with a first median plane ($M_1$) of the cutting insert (20);

an operative inner sloping surface (38') whose respective inner sloping engagement region (88) lies in a second plane forming an obtuse angle (β) with the first median plane ($M_1$), the acute and obtuse angles (α, β) being measured in the same direction from the first median plane ($M_1$); and operative first and second corner surfaces (40', 42') whose respective non-sloping corner engagement regions (72, 74) lie in a third plane that is substantially perpendicular to the first median plane ($M_1$) and to a second median plane ($M_2$) of the cutting insert (20), the second median plane ($M_2$) being perpendicular to the first median plane ($M_1$); wherein the operative first and second sloping surfaces (34', 36'), and the operative inner sloping surface (38') are located on a first side of the first median plane ($M_1$), and the operative first and second corner surfaces (40', 42') are located on a second side of the first median plane ($M_1$).

2. The cutting tool (10) of claim 1, wherein the cutting insert (20) does not engage more than one wall of the insert pocket (18).

3. The cutting tool (10) of claim 1, wherein the acute angle (α) is no more than 75 degrees, and the obtuse angle (β) is no less than 105 degrees.

4. The cutting tool (10) of claim 1, wherein the cutting insert (20) has a generally rectangular contour and two cutting corners (64), the cutting insert (20) being 180 degrees indexable about a through-bore axis ($T_1$) of a central through-bore (56), formed in the cutting insert (20).

5. The cutting tool (10) of claim 1, wherein the cutting insert (20) has a generally square contour and four cutting corners (64) located at four respective corners of the cutting insert (20), the cutting insert (20) being 90 degrees indexable about a through-bore axis ($T_1$) of a central through-bore (56), formed in the cutting insert (20).

6. The cutting tool (10) of claim 1, wherein the first and second operative sloping surfaces (34', 36') are located at opposite sides of the second median plane ($M_2$), and wherein the operative inner sloping surface (38') intersects the second median plane ($M_2$).

7. The cutting tool (10) of claim 1, wherein the first and second support surfaces (50, 52) are substantially planar, spaced apart surfaces, located at opposite sides of the second median plane ($M_2$).

8. The cutting tool (10) of claim 1, wherein:
the cutting insert (20) comprises a central through-bore (56) to receive a clamping screw (58) therein, the through-bore (56) having a through-bore axis ($T_1$);
the insert pocket (18) comprises a threaded bore (60) to screwably receive the clamping screw (58) therein, the threaded-bore (60) having a threaded-bore axis ($T_2$); and
the through-bore axis ($T_1$) and the threaded-bore axis ($T_2$) are both contained in the first median plane ($M_1$).

9. The cutting tool (10) of claim 1, wherein:
the first and second spaced apart operative sloping surfaces (34', 36'), the operative inner sloping surface (38') and the operative first and second corner surfaces (40', 42') are the only surfaces on the cutting insert having engagement regions in abutment with the attachment surface (32) of the insert pocket (18).

10. A cutting insert (20) having mutually perpendicular first and second median planes ($M_1$, $M_2$) comprising:

a top surface (22), a bottom surface (24) and a peripheral surface (26) extending therebetween, the peripheral surface (26) comprising two opposing major sides (28) and two opposing minor sides (30), wherein the bottom surface (24) comprises:

two major recessed surfaces (66) located on opposite sides of the second median plane ($M_2$) of the cutting insert (20);

two pairs of first and second corner surfaces (40, 42), alternately located at four respective corners of the bottom surface (24);

two pairs of first and second sloping surfaces (34, 36), each of the sloping surfaces (34, 36) sloping downward and outward, from respective major recessed surfaces (66), to respective corner surfaces (40, 42);

a central surface (86) located at a generally central area of the bottom surface (24); and two inner sloping surfaces (38), located at opposite sides of the bottom surface (24) on either side of the first median plane ($M_1$), the inner sloping surfaces (38) sloping upward and outward from opposite sides of the central surface (86) relative to the median plane ($M_1$), towards respective major sides (28); wherein:

the two pairs of first and second corner surfaces (40, 42), the two pairs of first and second sloping surfaces (34, 36) and the two inner sloping surfaces (38) together constitute two sets of cooperating engagement surfaces, each set including both sloping and non-sloping engagement regions for seating of the insert; and the sloping engagement regions of a given set are on a first side of the first median plane ($M_1$) and the non-sloping engagement regions of that same set are on a second side of the first median plane ($M_1$).

11. The cutting insert (20) of claim 10, wherein:
respective engagement regions (80, 82) of the sloping surfaces (34, 36) lie in a first plane forming an acute angle (α) with the first median plane ($M_1$);
an engagement region (88) of one of the inner sloping surfaces (38) lies in a second plane forming an obtuse angle (β) with the first median plane ($M_1$); and
wherein the acute and obtuse angles (α, β) are measured in the same direction from the first median plane ($M_1$).

12. The cutting insert (20) of claim 10, having a generally rectangular contour and two cutting corners (64), the cutting insert (20) being 180 degrees indexable about a through-bore axis ($T_1$) of a through bore (56) formed in the cutting insert (20).

13. The cutting insert (20) of claim 10, having a generally square contour and four cutting corners (64) located at four respective corners of the cutting insert (20), the cutting insert (20) being 90 degrees indexable about a through-bore axis ($T_1$) of a through bore (56) formed in the cutting insert (20).

14. The cutting insert (20) of claim 10, wherein the corner surfaces (40, 42) are substantially planar, co-lying in a plane generally perpendicular to the first and second median planes ($M_1$, $M_2$).

15. The cutting insert (20) of claim 10, wherein the average distance between the first corner surface (40) and the first sloping surface (34) is no less than 60 percent of the overall width of the cutting insert (20).

16. The cutting insert (20) of claim 10, wherein each inner sloping surface (38) is located in a side recess (49) formed in a corresponding major side (28).

17. The cutting insert (20) of claim 16, wherein the side recess (49) communicates with the bottom surface (24) of the cutting insert (20).

18. The cutting insert (20) of claim 16, wherein each inner sloping surface (38) and associated side recess (49) extend to an adjacent minor side (28).

19. The cutting insert (20) of claim 16, wherein the corner surfaces (40, 42) constitute the bottommost portions of the cutting insert (20), and protrude in a direction away from the top surface (22) relative to other surfaces formed on the bottom surface (24), including a central surface (86) thereof.

20. The cutting insert (20) of claim 16, wherein the corner surfaces (40, 42) are co-planar with a central surface (86) of the bottom surface (24).

21. The cutting insert (20) of claim 10, wherein the corner surfaces (40, 42) constitute the bottommost portions of the cutting insert (20), and protrude in a direction away from the top surface (22) relative to other surfaces formed on the bottom surface (24), including a central surface (86) thereof.

22. The cutting insert (20) of claim 10, wherein the corner surfaces (40, 42) are co-planar with a central surface (86) of the bottom surface (24).

* * * * *